May 12, 1931. J. P. TARBOX 1,804,658

AUTOMOBILE BODY AND MOUNTING THEREFOR

Filed Aug. 16, 1927

INVENTOR:

John P. Tarbox

Patented May 12, 1931

1,804,658

UNITED STATES PATENT OFFICE

JOHN P. TARBOX, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY AND MOUNTING THEREFOR

REISSUED

Application filed August 16, 1927. Serial No. 213,293.

My invention relates to the mounting of vehicle bodies on a chassis or underframe, and particularly to the mounting of a body superstructure having side walls made up of outer and inner panels upon a chassis or underframe.

In the mounting of such body superstructures upon the chassis or underframe, it has heretofore been proposed to have the hollow threshold portions, formed by the inner and outer panels, overlap and be secured to the sides of the chassis sills throughout the threshold regions. This construction, because it brought the top of the threshold portions of the body substantially in the plane of the top of the chassis sills resulted in a threshold as low as consistent with the necessary road clearances of the automotive organs carried by the chassis. The beneficial results resided not only in low thresholds permitting ease of entry and egress into and from the vehicle but, since this was combined with a chassis construction in which the flooring and seats were supported directly from the chassis, a substantial lowering of the center of gravity and hence, easier riding qualities were also attained.

It is the object of my invention to retain substantially all of these advantages, but to attain a firmer and more secure mounting of the body superstructure upon the chassis or underframe than has heretofore been the case.

To this end, I form the threshold portions of the body of such a construction that they have a very small vertical height but are of substantial width transversely of the body to form a wide seat, which rests directly on top of the chassis sill and is secured thereto. The advantages of this construction are that the entire load of the body superstructure is taken directly by the chassis sills and substantially no load is borne by the means securing the body to the sills.

Other and further objects and advantages will appear as the description proceeds.

Figure 1:
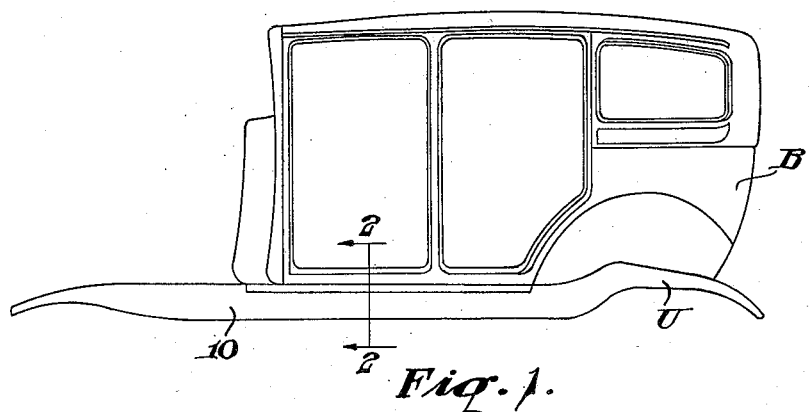
Fig. 1 shows in side elevation, a body unit according to the invention mounted on the underframe or chassis.

Referring to Fig. 1, the chassis or underframe is designated by U and the body superstructure, which may be assembled with the chassis as a unit, by the letter B. The chassis side sills 10 are extended forwardly and rearwardly of the body superstructure, as usual, but through those portions thereof which are arranged in overlapping relation with the body superstructure, they are given a contour in plan which conforms substantially to the contour of the lower side edge of the body superstructure. In other words, the side walls of the body overlie the chassis sills substantially throughout.

To secure a very shallow yet strong threshold construction I preferably form the combined inner and outer panels 11 and 12 of substantially Z-section, the web of the Z overlying and being secured to the inturned flange 13 at the top of the chassis sill 10 and the outer arm of the Z overlapping the vertical wall or web 14 of the sill while the inner arm of the Z projects upwardly to form the door overlap.

Figure 2:
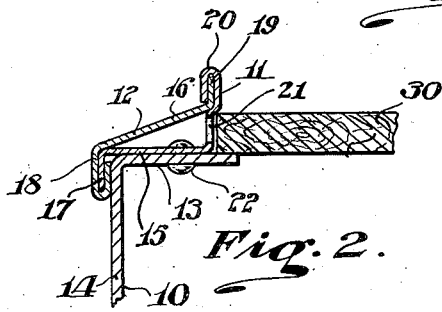
Fig. 2 is a section taken on the line 2—2 of Fig. 1 through the threshold, and showing the arrangement of body unit chassis sill, and floor board according to a preferred form of my invention.

In the form of the invention shown in Fig. 2, which is adapted to be used with chassis sill 10 of standard cross sectional form, namely, inwardly presenting channel form, with the upper flange 13 horizontal, I form the inner panel 11 with a horizontal web portion 15 to directly overlie the flange 13 of the sill and the outer panel with an inclined web portion 16 to form the inclined threshold adapted to receive a similarly inclined lower door jamb.

In their outer arms 17 and 18, the inner and outer panels are secured together by crimping the arm 18 of the outer panel 12 over the arm 17 of the inner panel, these arms together forming the outer arm of the Z of the threshold portion which overlaps the web 14 of the sill. The sill is preferably of deepened web form to serve as a splash board.

The inner arms 19 and 20 of the inner and outer panels are extended upwardly to form the door overlap, the joinder being by crimping the arm 19 over the arm 20.

By this construction, a hollow threshold structure of great strength is provided, which directly overlies the sill and which has a height not substantially greater except for the door overlap portion thereof, than the thickness of the floor boards, shown at 30. It is secured to the sill by riveting as shown at 22, or by bolting, the web portion 15 of the inner panel to the flange, 13 of the sill. Access is had to the space between the panels through openings 21 provided in the inner panel 11.

The flange 13 of the chassis sill is extended inwardly beyond the body threshold portion and supports in its inwardly extending portion the edges of the floor boards, 30.

Figure 3:
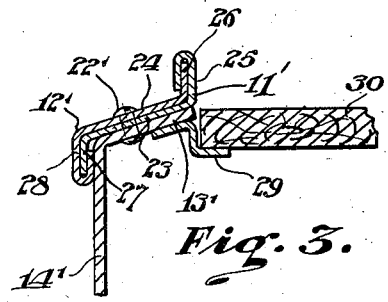
Figs. 3, 4 and 5 are corresponding sectional views of modified forms of the invention.

In the form of my invention shown in Fig. 3, both the outer and inner panels 12' and 11' of the Z-shaped threshold section have inclined webs as 23 and 24 and the two panels lie in contact with each other throughout being secured in their inner arms 25, 26 and their outer arms 27, 28, by crimping in a manner similar to the form already described and shown in Fig. 2. In this form, the upper flange 13' of the chassis sill is inclined similarly to the inclined webs 23 and 24, and the angle formed by this flange and the vertical web 14' of the sill nests within the angle formed by the web of the Z and the outer arm of the threshold portion of the body superstructure and the parts are secured by rivets as 22' or bolts extending through the three thicknesses of metal 13', 23, 24 in the threshold. A separate Z-shaped member is shown secured as by welding its upper arm to the under surface of the flange 13' of the sill and having its lower arm extended inwardly and supporting the edges of the floor boards 30.

Figure 4:
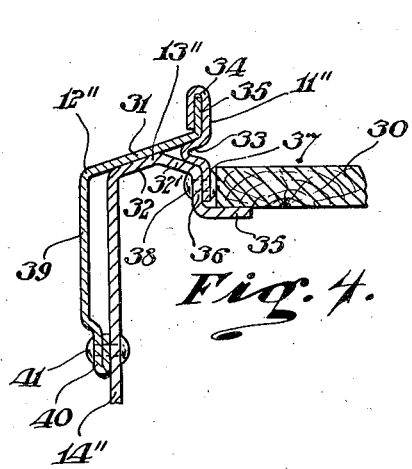

In the form of my invention shown in Fig. 4, I leave the lower side of the threshold portion of the body wall open, the outer panel resting through its inclined web 31, on top of the sill upon the similarly inclined portion 32 of the laterally extending flange 13'' at the top of the sill, while the inner panel 11'', rests through a reentrant portion 33 upon the oppositely inclined portion 32' of the sill flange and has its upper edge 34 crimped, as in the other forms described, over the arm 35 of the outer panel whereby to form the door overlap.

At the inner edge of the inclined portion 32' the sill flange 13'' is offset to provide a flange 35 for supporting the floor board 30. The vertical wall 36 joining this flange with the inclined portion 32' is overlapped by the lower edge 37 of the inner panel, which is secured thereto, by riveting, as at 38. The outer panel has its outer arm 39 spaced from the web of the chassis sill in its upper portion and is offset inwardly at the bottom and bent back upon itself as at 40 to provide a finished thickened edge and secured through this thickened edge to the web 14'' of the chassis sill, as by rivets 41.

Figure 5:
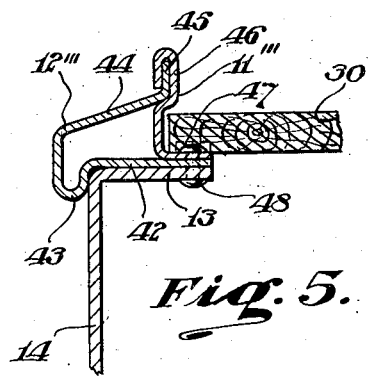

In the form of my invention shown in Fig. 5 the outer panel 12''' alone forms the web and the outer arm of the Z-section threshold, this panel being formed into a narrow channel section, facing inwardly the lower horizontal side wall 42 of the channel resting on the horizontal flange 13 of the chassis sill, which may be of the usual cross sectional shape, namely, inwardly facing channel, with the flanges of the channel at right angles to the web, as in Fig. 2.

The outer portion of this wall 42, is formed with a downwardly extending bead 43 which overlaps the top of the web 14 of the sill to form the outer arm of the Z-shaped threshold portion of the body. The upper side wall 44 of the channel is inclined similarly to the web of the outer panel in the other modifications already described, and is flanged upwardly at 45 to form with the crimped over edge 46 of the inner panel 11''', the door overlap. The inner panel bridges the mouth of the channel formed by the outer panel and is flanged at its lower edge as at 47 and secured, as by welding, to the edge of the outer panel the body superstructure being joined to the chassis by riveting as at 48 through the flange 48 and the edge portion of the outer panel and the sill flange 13. In this form of the invention, I may support the floor board from the flange 13 through the interposed edge portions of the outer and inner panels, as shown.

All of the forms disclosed have the common characteristic that the vertical walls of the body rest directly on top of the chassis or underframe sills through a substantial portion of their width and the threshold portions thereof are of a minimum vertical height and generally of Z-section whereby they are adapted to rest on the tops of the sills through the webs of the Z while the outer arm of the Z forms an overhang or finish for the joint and the inner arm provides the door overlap. It will further be noted that this construction, in all except one of the forms shown, permits the fastening means to be arranged where they are not visible from the outside.

While I have shown and described several modifications which embody the generic invention, I do not wish to limit myself to the particular constructions shown, but desire to cover such other modifications and changes as clearly fall within the spirit and scope of the appended claims.

What I claim and desire to secure by Letters Patent is:—

1. In a vehicle construction, a chassis underframe side sill having a transversely extending flange at the top, a body side wall structure comprising inner and outer panels of relatively light gauge joined in their lower margins and formed with a widened threshold portion seated on top of said flange and having a portion in which the panels are joined overhanging the side of said sill.

2. In a vehicle construction, a chassis underframe side sill having a transversely extending portion at the top, a body side wall structure comprising inner and outer panels of relatively light gauge joined in their lower margins, one of said panels being formed to provide a transversely extending portion of substantially the thickness of said wall seated on top of said transversely extending portion of the sill and having an upwardly extending door overlap portion at its inner edge.

3. In a vehicle construction, an underframe side sill and a body side wall arranged in superposed relation, said body side wall comprising outer and inner panels of relative light gauge secured together in the thresholds and forming a door overlap, one of said panels having a laterally extending body portion seated on top of the sill and an outer depending portion.

4. In a vehicle construction, an underframe side sill of angle section having a vertical branch and an inwardly extending branch at the top of said vertical branch, and a body structure having a threshold portion, said threshold portion being generally of Z-section, the web of the Z being seated on the inwardly extending branch of the sill, the outer arm of the Z depending and its inner arm upstanding.

5. In a vehicle construction, an underframe side sill of angle section having a vertical branch and a transversely extending branch at the top of the vertical branch, and a body structure having a threshold portion, said threshold portion being generally of Z-section and seated on the transversely extending branch of the sill through the web portion of the Z, the arms of the Z forming respectively, a door overlap and an outer overlap for the sill.

6. In a vehicle construction, an underframe of angle section having a vertical branch and an inwardly extending branch, a body structure having a threshold portion resting on the inwardly extending branch of the sill and secured to said sill, said threshold section comprising inner and outer panels of relatively light gauge crimped together in at least one of their edges and forming a generally Z-section structure seated on the inwardly extending branch of the sill through the web of the Z.

7. In a vehicle construction, a chassis underframe having a side sill provided with a horizontal top flange, a body structure having a threshold portion comprised of inner and outer panels of relatively thin gauge forming a hollow structure having a horizontal portion seated on said top flange of the sill and having an inclined portion forming the door jamb.

8. In a vehicle construction, a chassis underframe having a side sill provided with a top flange, and a body structure having a threshold portion comprised of inner and outer panels of relatively thin gauge seated through a transversely extending portion of one of said panels on the top flange of the sill, and forming through another transversely extending portion of one of said panels the jamb face of the door.

9. In a vehicle construction, an underframe having a side sill provided with a substantially horizontal top portion, a body structure having a threshold portion comprised of inner and outer panels of relatively thin gauge joined in their margins and forming a hollow structure having a substantially horizontal portion seated on the top portion of the sill, an inclined door jamb portion, and a depending portion at the juncture of the horizontal and door jamb portions.

10. A threshold construction for vehicle bodies built up out of inner and outer panels of relatively thin gauge, each of substantially Z-section with the web of the Z extending transversely and the arms extending respectively upwardly and downwardly, the panels being joined in at least one of their margins by crimping the arm of one over the arm of the other.

11. A threshold construction for vehicle bodies built up out of inner and outer panels of relatively light gauge each of substantially Z-section, the web of one Z being inclined to the web of the other, and joined together in both their margins by crimping the adjacent arm of one panel over the adjacent arm of the other panel.

In testimony whereof I hereunto affix my signature.

JOHN P. TARBOX.